Figure 1:
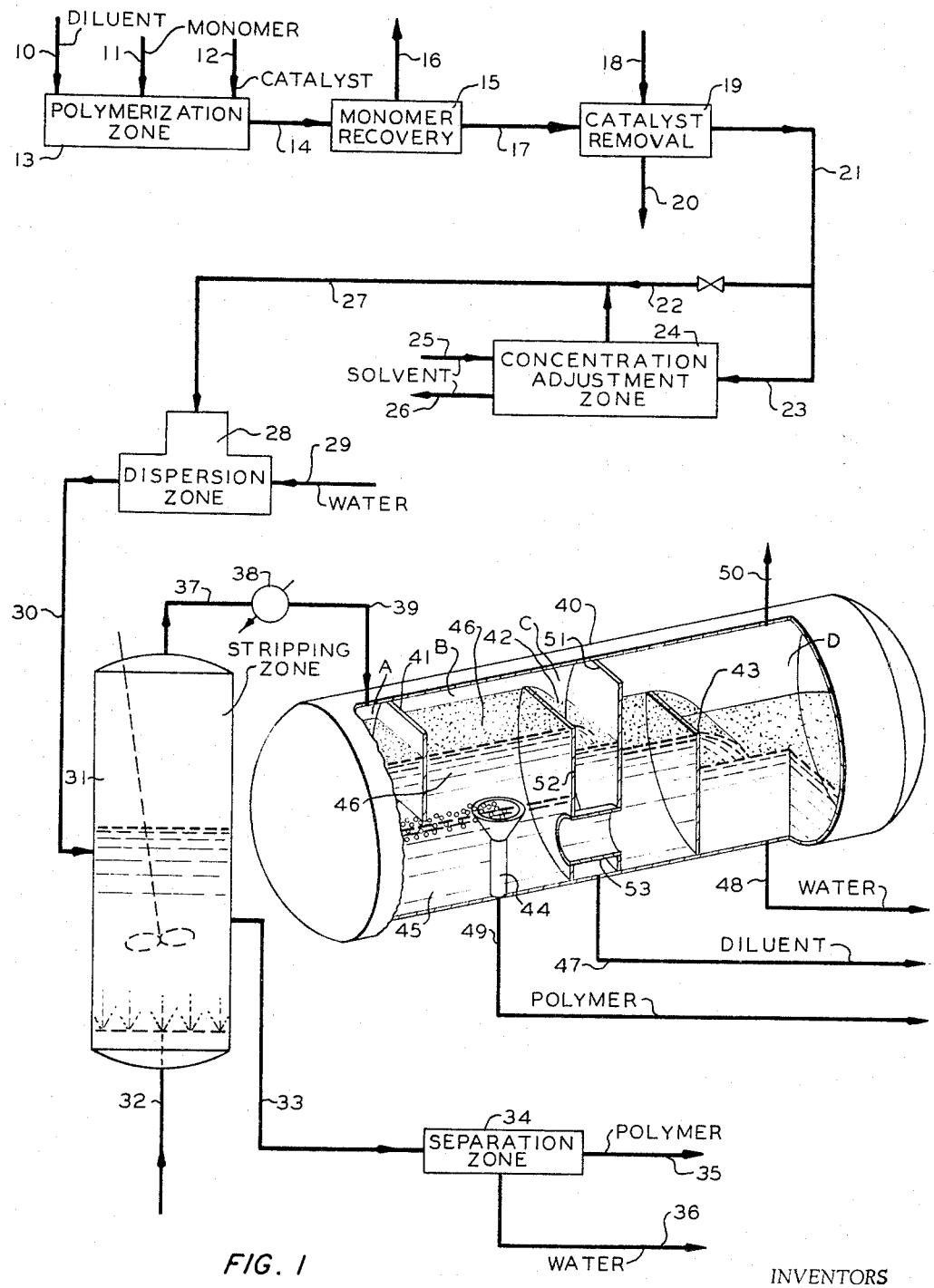

INVENTORS
W. J. WRIDE
J. J. MOON

United States Patent Office 3,278,041
Patented Oct. 11, 1966

3,278,041
APPARATUS FOR SEPARATING THREE-PHASE DISPERSIONS
William J. Wride and John J. Moon, Bartlesville, Okla., assignors to Phillips Petroleum Company, a corporation of Delaware
Filed Aug. 6, 1962, Ser. No. 215,194
1 Claim. (Cl. 210—532)

This invention relates to separation. In accordance with one aspect, this invention relates to the separation of a three-phase dispersion comprising two liquid phases of different specific gravity and a solid phase having a specific gravity intermediate the two liquids. In accordance with another aspect, this invention relates to apparatus for separating entrained polymer solids from hydrocarbon solvents and water.

It is known in the art to prepare thermoplastic materials by polymerizing unsaturated monomers to form high molecular normally solid thermoplastic polymers. Such polymers are useful for forming various objects of commerce such as by extrusion, injection molding, vacuum forming and the like. Such polymers are frequently formed in the presence of a hydrocarbon diluent or solvent. The polymer can then be separated from the hydrocarbon diluent by spraying or otherwise dispersing the polymer and diluent into water, thus forming a three-phase dispersion of water, liquid, hydrocarbon and solid granular polymer. The polymer generally has a specific gravity or density intermediate that of the hydrocarbon diluent and water. It has been the practice in the art to pass this three-phase dispersion to a stripping zone wherein the diluent is stripped off by steam distillation, or the like, and the polymer-water slurry passed to a separation zone where polymer is removed by filtration, settling, or centrifuging and subsequently dried.

Considerable difficulty has been experienced in the separation of the polymer-hydrocarbon-water dispersion due to polymer particle carry over in the overhead vapor stream from the steam stripping zone. The polymer particles deposited in the overhead phase separator due to polymer carry over results in separator fouling as well as considerable pump plugging in the subsequent solvent purification system. As a result of the polymer particle carry over problem from the stripping zone, considerable effort has been exerted to minimize this carry over so as to improve plant operations.

According to the invention, a convenient apparatus is provided for separating three-phase dispersions of polymer, hydrocarbon diluent and water, either prior to or subsequent to steam stripping, whereby substantially complete polymer removal is achieved, thus obviating operational difficulties previously experienced prior to installation of the invention.

Accordingly, an object of this invention is to provide an apparatus for separating solids from admixture with two immiscible liquids, said solid having a specific gravity intermediate the two liquids.

Another object of this invention is to provide a relatively simple apparatus adapted to effect substantially complete separation of precipitated polymer from a three-phase dispersion comprising two immiscible liquids and solid granular polymer.

A further object of this invention is to provide apparatus for recovering granular polymer carried overhead from a steam stripping zone utilized for the separation of a three-phase dispersion comprising solvent, water and granular polymer.

Other objects and aspects as well as the several advantages of the invention will be apparent to those skilled in the art upon further consideration of the specification, the drawings and the appended claims.

According to the invention, a three-phase mixture comprising two immiscible liquids and a solid having a specific gravity intermediate the two liquids is readily separated by introducing same into one end of a substantially horizontal elongated compartmented separation zone wherein the dispersion separates into an upper liquid phase, a lower liquid phase, and an intermediate solids phase at the interface between the two liquid phases, flowing the upper liquid phase and solids phase over a solids collecting section, withdrawing collected solids from said solids collecting section and said separation zone, flowing the upper liquid phase into a liquid collection section and withdrawing same from said separation zone, flowing said lower heavier liquid phase over a flow arrestor or weir, and withdrawing said lower heavier liquid from the other end of said separation zone.

In another embodiment of the invention, there is provided a separation of stratification apparatus comprising a generally horizontal tank, solids skimming and collecting means in said tank, light liquid collecting means in said tank, light liquid withdrawal means attached to said liquid collecting means, solids withdrawal means attached to said skimming and collecting means, a heavy liquid weir, and heavy liquid collecting and withdrawing means attached to said tank.

The three-phase dispersion separated according to the invention will ordinarily be an overhead stream removed from a steam stripping zone wherein a dispersion consisting of solvent, water and polymer is treated to remove the solvent therefrom. However, the invention is equally applicable to the treatment of three-phase dispersion that has not been subjected to steam stripping as for example, a three-phase dispersion obtained after water precipitation of polymer from solution.

The mixture to be treated by the apparatus of this invention is any mixture comprising two immiscible liquids and a solid having a density intermediate the density of the two liquids. The mixture most generally employed will be of a thermoplastic polymer, water and a hydrocarbon. This mixture will most frequently result from dispersing a polymer in a hydrocarbon slurry or solution into water.

While the invention is particularly valuable in recovering polymer from three-phase dispersions as described above, the invention is broadly applicable for recovering solids generally from admixture in two immiscible liquids. Examples of such solids include natural and synthetic rubber e.g., polymers of conjugated dienes or isobutylene; copolymers of these with copolymerizable monomers, e.g., butadiene-styrene copolymer, butadiene-ethylene copolymer and the like; resins such as polystyrene, vinyl resins such as polyvinylchloride and polyvinylacetate; cellulosic resins such as celloloid acetate and acetate butyrate esters, nitrocellulose and ethylcellulose; polymers of acrylic and methacrylic acids and their derivatives such as vinylacrylate and vinylmethylacrylate; polyesters; polyamides, polyorganosiloxanes; polyfluorocarbons; epoxy resins; isoolefinic polymers such as styrene, isobutylene and other copolymers of isoolefins and substituted styrenes; copolymers of isoolefins and diolefins such as butyl rubber; polymers of acetylenic compounds, e.g., vinylacetylene and the like.

In particular, this invention is applicable to polymers of 1-olefins, preferably mono-1-olefins of 2 to 8 carbon atoms per molecule. Examples of such 1-olefins include ethylene, propylene, 1-butene, 1-penetene, 1-hexene, 1-octene, 4-methyl-1-penetene, 4-methyl-1-hexene, 5-ethyl-1-hexene, 6-methyl-1-heptene, 3-ethyl-1-penetene and the like. Homopolymers or copolymers of such 1-olefins can be used. More preferably, the polymer will be prepared from monomers comprising at least 50 weight percent ethylene with one or more such 1-olefins. These latter copolymers as well as the homopolymers of ethylene will be referred to herein as ethylene polymers. These 1-olefins can be polymerized alone, with each other, or with other monoolefins such as butene-2, pentene-2, isobutylene and the like, or with diolefins such as 1,3-butadiene; however, the preferred copolymer is one prepared from monomers comprising at least 50 weight percent 1-olefins.

The above polymers can be prepared by any method known in the art, e.g., solution polymerization, gas phase polymerization, liquid phase polymerization and the like. Generally, the polymerization is effected in a hydrocarbon diluent and the polymer obtained is found in a two-phase dispersion. However, polymer chlorinated in the presence of a chlorinated diluent may be suitably recovered from the diluent by dispersing the polymer-diluent mixture into water, e.g., chlorinated polyethylene and carbon tetrachloride. In this case, the chlorinated diluent would be the heavier diluent and the water the lighter and the chlorinated polymer would be heavier than the water and float on the diluent. Ordinarily, however, the hydrocarbon diluent will be the lighter liquid and water will be the heavier liquid with the granular polymer floating on the water.

Figure 2:
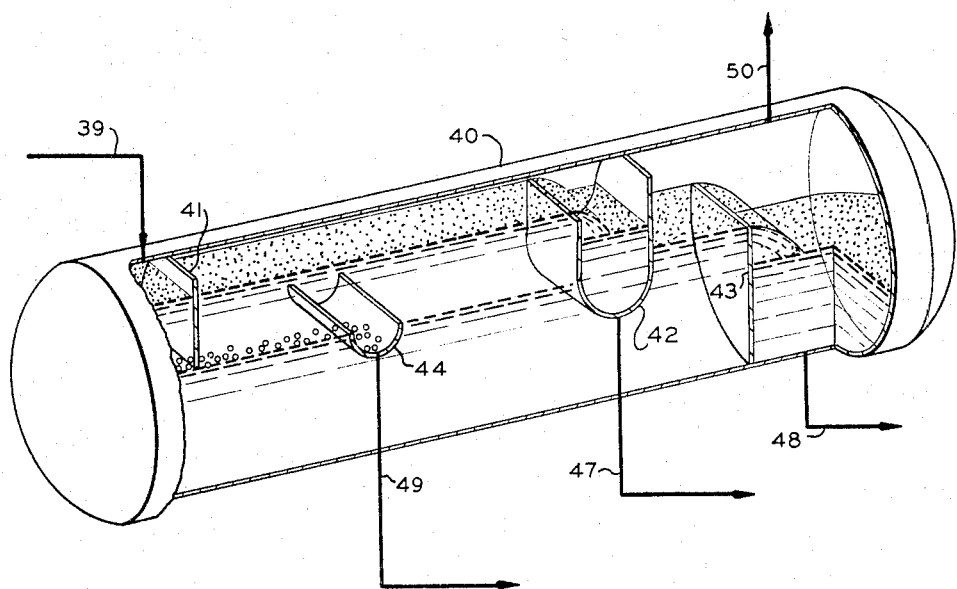

The invention will be further described with reference to the drawings wherein FIGURE 1 represents a schematic flow diagram of the process of the invention and a representation of the apparatus useful therein shown in perspective and wherein FIGURE 2 is a perspective view of another specific embodiment of the apparatus.

Referring now to FIGURE 1, diluent, monomer and catalyst are fed via lines 10, 11 and 12 respectively to polymerization zone 13. The polymerization zone can be cooled by passing a coolant such as water therethrough by indirect heat exchange means (not shown). The effluent from zone 13 passes to monomer recovery zone 15 by way of line 14. The unreacted monomers are flashed off and are removed via line 16 and can be recycled to polymerization zone 13. The effluent from zone 15 comprising diluent, polymer and catalyst is then passed by way of line 17 to catalyst removal zone 19 where the catalyst is removed by filtration, centrifuging or any other convenient means. The catalyst, if removed by filtration, is flushed out of the system by additional diluent supplied by way of line 18 and removed from zone 19 by way of line 20. When desired, zone 19 can be omitted and the catalyst can be retained in the polymerization effluent.

The polymer-diluent mixture removed from zone 19 is then passed to concentration adjustment zone 24 by way of lines 21 and 23 where the concentration of polymer and diluent is adjusted for optimum precipitation properties by adding or removing diluent as desired by way of lines 25 and 26. This zone is not always desired and the effluent in zone 19 can pass directly to dispersion zone 28 by way of valved line 22 and line 27, if desired. Effluent from zone 24 passes by way of line 27 to dispersion zone 28 where the polymer and diluent are dispersed in water supplied by way of line 29. If the polymer is in solution in the diluent, it will be precipitated when mixed with cool water in the dispersion zone. The temperature of the resulting three-phase dispersion of solid polymer, diluent and water is such that the diluent and water remain substantially in the liquid phase.

While the discussion herein is primarily directed to the preparation of a three-phase dispersion comprising water, diluent and solid polymer, it will be understood by those skilled in the art that the following description of the invention is applicable to any three-phase dispersion of the type previously described. In any event, sufficient water is admixed with the polymer solution to provide a resulting temperature in the range of 100–200° F., preferably about 120–150° F.

The resulting dispersion obtained in zone 28 is passed by way of line 30 to stripping zone 31. The stripping zone can be operated at any desired temperature and pressure as long as solvent is vaporized. Preferably the stripper will operate at atmospheric pressure and at about 170° F.; however, under vacuum, the temperature will be lower, for example, 140° F. and 7 p.s.i.a. Since the polymer is lighter than water, it will float and an agitator is provided to maintain the solids in dispersion. While any means of supplying heat to the stripping zone can be used, steam is especially effective. Steam from line 32 is supplied to the steam stripper by way of a steam nozzle head in the base of the stripping zone.

A mixture of polymer solids and water and a small amount of solvent is removed from stripping zone 31 by way of line 33 and passed to separation zone 34. Separation zone 34 can be any suitable means for effecting separation of polymer from water. Separated polymer is removed from zone 34 by way of line 35 and water by way of line 36.

Steam and solvent vapor and entrained polymer solids are passed overhead from stripper 31 by way of line 37 to condenser 38 where most of the vapors are condensed and then passed to separation zone 40. The three-phase dispersion of polymer, diluent and water recovered overhead from stripping zone 31 is introduced into the top of one end of vessel 40.

Vessel 40 is divided into four sections, A, B, C and D by dam or baffle 41, collecting means 42, and weir of baffle 43. Section A is a phase separation or stratification section wherein the dispersion separates into a lower liquid level of water, an upper liquid level of diluent and an intermediate polymer solids phase floating on the water phase. The three-phases flow into section B wherein the polymers solids are collected by polymer collecting means 44. The top of solids collecting means 44 is at the top of water level 45 or slightly above so that the polymer solids and diluent flow over solids collecting means 44. Polymer solids collected in collector 44 are removed from vessel 40 by way of line 49 and passed to further treatment as desired. Diluent phase 46 flows into diluent collector 42 and is removed from vessel 40 by way of line 47. Water layer 45 flows into compartment D and passes over weir 43 and is removed from vessel 40 by way of line 48 for further use as desired.

As shown in FIGURE 1, polymer collecting means 44 is a truncated cone, the top of which is at or slightly above the top of water layer 45. However, it is within the scope of the invention to utilize a trough or other shaped collecting means (see FIGURE 2) which extends across vessel 40 so as to collect the dispersed polymer solids. Similarly, diluent collector 42 can be a trough or other suitable means (see FIGURE 2) extending across the separation tank positioned to collect diluent from an upper level in vessel 40 substantially free of polymer solids and water. As shown in FIGURE 1, the diluent collecting means is the open space between two baffles wherein the downstream side extends near the top of vessel 40 than the other side (upstream side) so as to prevent diluent from entering section D of vessel 40. Sections A, B, C and D in vessel 40 are preferably in open communication with each other at the top of vessel 40 so as to equalize the pressures between the different sections. A vapor vent 50 is provided at the top of the downstream end of vessel 40 to remove noncondensibles from vessel 40 and the system.

In the operation of this invention, the three-phase dispersion recovered from zone 31 passes via line 39 to section A of vessel 40. The two liquid phases separate and the solid phase collects at the interface. The lighter liquid (diluent) flows into collector 42 and is removed by way of line 47 from the vessel for purification and recycle. The heavier liquid (water) passes through collector 42 by way of pipe 53 and flows over weir 43 and is removed from vessel 40 by way of line 48. The polymer solids passing over collecting means 44 settle into said means and then are removed from the vessel by way of line 49.

Specific embodiment

To further illustrate this invention, the apparatus is described wherein a typical three-phase dispersion comprising diluent, water and polymer is separated. Diluent is cyclohexane and polymer is polyethylene having a density of approximately 0.960. The vessel 40 has the following dimensions:

Overall vessel size: 7 ft. diameter by 20 ft. long.

Weir 43 is spaced 2 feet from the end of the vessel and extends 4 feet 10 inches above the bottom of the vessel.

Side 51 of collecting means 42 is 4 feet from weir 43 and extends 6 feet 6 inches above the bottom of vessel 40.

Side 52 of means 42 is spaced 2 feet 8 inches from side 51 and extends 5 feet 4 inches from the bottom of vessel 40.

Collecting means 44 is spaced two feet from side 52 of means 42 and top of means 44 is at the interface between liquids 45 and 46.

Collecting means 44 is 8 inches in diameter at the top and reduces down to a 3 inch diameter pipe which extends to the bottom of tank 40.

Baffle 41 is spaced approximately 2 feet from the inlet end of vessel 40 to confine turbulene to the feed entrance area only and allow polymer to settle to solvent-water interface in the rest of the entry chamber.

Separation of polymer solids from a cyclohexane-water stream in the apparatus of the invention described above has resulted in substantially complete removal of entrained polymer, thereby improving the overall operation of the subsequent processing steps, especially the diluent and slovent recovery steps. No pump plugging due to polymer entrainment has been observed.

It will be obvious to one skilled in the art to make modifications and still obtain advantages of this invention. For example, it would be within the scope of the invention to pass the three-phase dispersion of polymer solids solvent, and water directly from zone 28 to vessel 40 for separate recovery of polymer, diluent and water. By such an operation, a considerable heat savings could be realized since the entire three-phase dispersion would not be subjected to steam stripping and only a concentrated polymer slurry recovered from vessel 40 by way of line 49 would need to be subjected to steam stripping. Obviously, treatment of the entire three-phase dispersion in vessel 40 without intermediate stripping would require modification in the size of the various vessel elements, particularly the polymer collecting means.

As will be evident to those skilled in the art, many variations and modifications of this invention can be practiced in view of the foregoing disclosure. Such variations and modifications are clearly believed to come within the spirit and scope of the invention.

We claim:

An apparatus useful for separating a three-phase dispersion of two immiscible liquids of different specific gravity and a solid having a specific gravity intermediate the two liquids into two separate liquids and a solid fraction comprising said solids and being substantially reduced in content of both of said liquids, said liquids forming an upper and a lower liquid level, respectively, and an interface between said liquids, said apparatus comprising, in combination, a generally horizontal tank, feed inlet means at one end of said tank, upwardly opening solids collecting means positioned from said inlet end of said tank having its open end positioned at said interface to continuously collect said solids, solids removal conduit means communicating with said solids collecting means to continuously remove solids from said tank, first weir means spaced from the other end of said tank and connected to the bottom of said tank, liquid collecting means positioned between said first weir and said solids collecting means, said solids collecting means being positioned upstream of said liquid collecting means to remove said solids before they arrive at said liquid collecting means, said liquid collecting means comprising a first baffle means having its upper extremity located at the top of said upper liquid level to allow passage thereover of a first liquid having the lower specific gravity, said first baffle being in direct contact with said liquid levels and said interface and extending below said interface to prevent the passage of said first liquid and uncollected solids thereunder and terminating short of the bottom of said tank to allow passage thereunder of the second liquid having the higher specific gravity, and second baffle means positioned between said first baffle means and said weir and connected to said first baffle means in sealed relationship to form an upwardly opening trough for collecting said first liquid, liquid removal conduit means communicating with said liquid collecting means for removing said first liquid from said tank, said weir having its upper extremity at an elevation intermediate the top of said upper liquid level and said interface for allowing passage thereover of said second liquid, liquid removal means in the bottom of said tank between said weir and said other end of said tank for removing said second liquid from said tank.

References Cited by the Examiner

UNITED STATES PATENTS

| | | | |
|---|---|---|---|
| 261,124 | 7/1882 | Baker | 210—532 |
| 2,664,963 | 1/1954 | Lovelady et al. | 55—174 |
| 2,767,802 | 10/1956 | Orrell | 55—174 X |
| 2,857,055 | 10/1958 | Glasgow | 210—540 |
| 2,869,675 | 1/1959 | Coggins | 55—174 X |
| 2,963,157 | 12/1960 | Kuss et al. | 210—83 |
| 3,067,877 | 12/1962 | Mobley | 210—83 |
| 3,084,150 | 4/1963 | Mills | 260—94.9 |
| 3,086,965 | 4/1963 | Weedman | 260—94.9 |

REUBEN FRIEDMAN, *Primary Examiner.*

JOSEPH L. SCHOFER, *Examiner.*

D. M. RIESS, F. L. DENSON, *Assistant Examiners.*